US012451832B2

United States Patent
Grassl et al.

(10) Patent No.: US 12,451,832 B2
(45) Date of Patent: Oct. 21, 2025

(54) METHOD FOR OPERATING AN INVERTER DEVICE OF AN ELECTRIC DRIVE DEVICE, CONTROL UNIT, ELECTRIC DRIVE DEVICE AND MOTOR VEHICLE

(71) Applicants: AUDI AG, Ingolstadt (DE); VOLKSWAGEN AG, Wolfsburg (DE)

(72) Inventors: Tobias Grassl, Denkendorf (DE); Marko Kertes, Munich (DE); Mathias Korn, Regensburg (DE)

(73) Assignees: AUDI AG, Ingolstadt (DE); VOLKSWAGEN AKTIENGESELLSCHAFT, Wolfsburg (DE)

( * ) Notice: Subject to any disclaimer, the term of this patent is extended or adjusted under 35 U.S.C. 154(b) by 122 days.

(21) Appl. No.: 18/167,388

(22) Filed: Feb. 10, 2023

(65) Prior Publication Data
US 2023/0268867 A1     Aug. 24, 2023

(30) Foreign Application Priority Data
Feb. 18, 2022    (DE) ...................... 10 2022 103 848.3

(51) Int. Cl.
*H02P 29/032*     (2016.01)
*B60L 50/60*      (2019.01)
*H02P 27/06*     (2006.01)

(52) U.S. Cl.
CPC ............ *H02P 29/032* (2016.02); *H02P 27/06* (2013.01); *B60L 50/60* (2019.02)

(58) Field of Classification Search
CPC .. H02P 3/22; H02P 3/18; H02P 29/025; H02P 3/24; H02P 6/24; H02P 1/029
See application file for complete search history.

(56) References Cited

U.S. PATENT DOCUMENTS

2017/0353140 A1* 12/2017 Baburajan ............... H02M 1/32
2018/0183375 A1*  6/2018 Liu ........................... H02P 3/22
2020/0067443 A1    2/2020 Watanabe et al.

FOREIGN PATENT DOCUMENTS

DE    10 2011 083 945 A1    4/2013
DE    10 2019 201 004 A1    7/2020
DE    10 2022 103 848.3      2/2022

* cited by examiner

*Primary Examiner* — Said Bouziane
(74) *Attorney, Agent, or Firm* — STAAS & HALSEY LLP

(57) ABSTRACT

An inverter device of an electric drive device may be configured to convert a direct voltage of an intermediate circuit of the electric drive device into a multi-phase alternating current to operate an electric motor of the electric drive device. A safety signal may be received by a control unit of the electric drive device, which instructs the control unit to operate the electric motor in a safe operating mode and to discharge the intermediate circuit at same time. If an active short circuit mode is preset, the inverter device is controlled to operate the electric motor in the active short circuit mode and to discharge the intermediate circuit in the discharge mode. If a freewheel mode is preset, the inverter device is controlled to operate the electric motor in the freewheel mode and, upon satisfaction of a current criterion, controlled to discharge the intermediate circuit in the discharge mode.

14 Claims, 4 Drawing Sheets

METHOD FOR OPERATING AN INVERTER DEVICE OF AN ELECTRIC DRIVE DEVICE, CONTROL UNIT, ELECTRIC DRIVE DEVICE AND MOTOR VEHICLE

CROSS-REFERENCE TO RELATED APPLICATIONS

This application claims the benefit of German Application No. 10 2022 103 848.3 filed on Feb. 18, 2022, in the German Intellectual Property Office, the disclosure of which is incorporated herein by reference in its entirety.

BACKGROUND

1. Field

The examples describing an invention relate to a method for operating an inverter device of an electric drive device, to a control unit, to an electric drive device as well as to a motor vehicle.

2. Description of Related Art

Electric motors in electric drive devices of motor vehicles are usually operated with a three-phase alternating current. For providing the three-phase alternating current, electric drive devices comprise inverter devices, which are intended to convert a direct voltage of an intermediate circuit of the electric drive device into the three-phase alternating current for operating the electric motor. In a fault case of an operation of the electric drive device, it is required to operate the electric motor in an operating mode, which is referred to as safe state. In it, abrupt changes of the torque are avoided.

Two such safe operating modes exist. A first operating mode is the so-called freewheel. For achieving the freewheel, all of the high-side switches and low-side switches of the inverter device are switched to blocking. Antiparallel to the switches, there are diodes, via which the current, which flows in the stator at the point of time, can further flow via the intermediate circuit capacitor and slowly dissipates.

The other safe operating mode is the so-called active short circuit. Therein, switches of the inverter device are switched such that at least some of the phase windings of the electric motor are short-circuited and thus the current can dissipate.

In addition, it is provided for safety reasons to discharge the high-voltage intermediate circuit of the drive device. For example, the discharge can be effected via discharge resistors, which can be connected in parallel with the high-voltage intermediate circuit. Another possibility of discharge is in discharging the high-voltage intermediate circuit via switches of the inverter device.

However, it is required herein that the power semiconductors of the inverter device are switched such that a current flow through the inverter device is allowed. However, it is required in the freewheel to switch the power semiconductors to blocking and thus the current can only flow via the freewheel, which the diodes form. For this reason, it is not possible without further measures to perform an active discharge via the present power semiconductors.

DE 10 2016 207 373 A1 discloses an inverter assembly, an electric drive system and a method for discharging an intermediate circuit capacitor in an inverter assembly. The discharge of the intermediate circuit capacitor is effected by clocking a semiconductor switch within the inverter. Therein, that bridge leg of the inverter is respectively selected for clocking, the phase voltage of which is smallest.

CN 103738197 A discloses a method for discharging an intermediate circuit capacitor for electric vehicles. During the discharge operation, three lower half bridge arms are in an open state, wherein the state of the motor is a three-phase short circuit, which does not generate an inverted electrical potential, whereby the problem is solved that the permanent magnet synchronous motor of the electric vehicle charges the intermediate circuit capacitor during the rotation.

CN 108964572 A discloses a method and a system for active short circuit control of a motor, wherein the motor is controlled by an inverter.

SUMMARY

The described examples allow a strategy for active discharge of the intermediate circuit and achieving a safe operating mode.

The examples are recited by the subject matters of the independent claims.

Advantageous developments of the examples may be disclosed by the features of the dependent claims, the following description as well as the figures.

An example relates to a method for operating an inverter device of an electric drive device, wherein the inverter device includes at least two half bridges with a respective low-side switch and a respective high-side switch. The inverter device is configured to convert a direct voltage of an intermediate circuit of the electric drive device into a multi-phase alternating current for operating an electric motor of the electric drive device. In other words, the electric drive device includes the inverter device to convert the direct voltage provided by the intermediate circuit into the multi-phase alternating current. It is provided that the inverter device comprises the respective half bridge for each phase of the multi-phase alternating current, which includes the respective low-side switch and the respective high-side switch.

In the method, it is provided that a safety signal is received by a control unit of the electric drive device, which is provided for controlling the inverter device, which safety signal instructs the control unit for operating the electric motor in a predetermined safe operating mode and for discharging the intermediate circuit in a predetermined discharge mode at the same time. In other words, the safety signal is received by the control unit, which instructs the control unit to control the inverter device of the electric drive device such that the electric motor is operated in the predetermined safe operating mode and the intermediate circuit is discharged in the predetermined discharge mode.

In the method, it may be provided that a case distinction is performed, which depends on a type of the predetermined safe operating mode. If the predetermined safe operating mode is preset as a predetermined active short circuit mode, the inverter device is controlled by the control unit for operating the electric motor in the predetermined active short circuit mode and for discharging the intermediate circuit in the predetermined discharge mode at the same time. In other words, it is provided that the switches of the inverter device are switched by the control unit such that the electric motor is operated in the active short circuit mode and the active discharge of the intermediate circuit in the predetermined discharge mode is effected at the same time.

In case that the predetermined safe operating mode is preset as a predetermined freewheel mode, it is provided that the inverter device is controlled by the control unit for operating the electric motor in the predetermined freewheel mode and a current strength captured by a sensor unit in the electric motor is at least once captured and examined for satisfying a predetermined current criterion by the control unit. The predetermined current criterion relates to a current strength in the electric motor and is selected such that an undesired erratic torque change does not occur when the inverter device is switched from the freewheel mode into the discharge mode. In other words, it is provided that in case that the predetermined safe operating mode is the predetermined freewheel mode, the control unit controls the inverter device in order that the electric motor can be operated in the predetermined freewheel mode.

During the operation of the electric motor in the predetermined freewheel mode, the current strength in the electric motor is captured by the sensor unit. It is examined by the control unit if the predetermined current criterion is satisfied by the captured current strength. For example, the current criterion can preset that it has to be fallen below a predetermined threshold value of the current strength. It is provided that upon satisfaction of the predetermined current criterion, the inverter device is controlled by the control unit for terminating the operation of the motor in the freewheel mode and for discharging the intermediate circuit in the predetermined discharge mode. In other words, it is provided that the operation of the motor in the freewheel mode is terminated as soon as the predetermined current criterion is satisfied. After terminating the predetermined freewheel mode, the inverter device is controlled by the control unit for switching the predetermined discharge mode for discharging the intermediate circuit.

By the described examples, an advantage may arise that the point of time of initiation of the discharge mode is effected depending on the selected safe operating mode of the motor and thereby an erratic change of the torque is prevented.

The described examples also include other developments, by which further advantages may arise.

A development of an example provides that at least two of the low-side switches of the inverter device are switched to conducting by the control unit in the predetermined active short circuit mode to short-circuit at least two phase windings of the motor. All of the low-side switches of the inverter device can also be switched to conducting. In other words, it is provided that the active short circuit mode includes short-circuiting at least two phase windings of the motor, wherein at least two of the low-side switches of the inverter device are switched to conducting by the control unit for short-circuiting the at least two phase windings.

A development of an example provides that at least one of the high-side switches and at least one of the low-side switches of the inverter device are switched to conducting by the control unit in the predetermined active discharge mode. Herein, at least one of the switches can be pulsed or operated in the linear operation. In other words, it is provided that the intermediate circuit is discharged in that at least one of the high-side switches and at least one of the low-side switches of the inverter device are set to conducting in the inverter device by the control unit. Thereby, it is allowed that a current can flow through the high-side switch and the low-side switch of the inverter device, which discharges the intermediate circuit. Thereby, an advantage may arise that discharge can be effected via the inverter device and thus provision of additional discharge resistors is not required.

A development of an example provides that each of the low-side switches of the inverter device and each of the high-side switches of the inverter device are switched to blocking by the control unit in a predetermined freewheel mode. In other words, it is provided that the inverter device is switched by the control unit for operating the electric motor in the freewheel mode such that a current cannot flow through any one of the low-side switches and the high-side switches. In this operating state, the current flow can only occur via the antiparallel diodes, which form the freewheel path.

A development of an example provides that at least two of the high-side switches of the inverter device are switched to conducting by the control unit in the predetermined active short circuit mode, to short-circuit at least two phase windings of the motor. All of the high-side switches of the inverter device can also be switched to conducting. In other words, the short circuit is provided in the at least two phase windings of the motor in that at least two of the high-side switches of the inverter device are switched to conducting.

A development of an example provides that upon satisfaction of the predetermined current criterion, the inverter device is controlled by the control unit for the active short circuit mode and in the predetermined discharge mode at the same time. In other words, it is provided that upon satisfaction of the predetermined current criterion, the predetermined freewheel mode is terminated. At the same time, both the active short circuit mode and the discharge mode are switched in the inverter device by the control unit. Thereby, an advantage may arise that the electric motor is both short-circuited and discharge of the intermediate circuit can be effected.

An example relates to a control unit for operating the inverter device of the electric drive device according to the described examples of the method. The control unit can comprise a data processing device or a processor device, which is configured to perform the method according to the described examples. Hereto, the processor device can comprise at least one microprocessor and/or at least one microcontroller and/or at least one FPGA (Field Programmable Gate Array) and/or at least one DSP (Digital Signal Processor). Furthermore, the processor device can comprise program code, which is configured to perform the method according to the described examples upon execution by the processor device. The program code can be stored in a data storage of the processor device.

An example relates to an electric drive device, which comprises a control unit for operating an inverter device according to the described examples of the control unit.

An example relates to a motor vehicle, which comprises an electric drive device according to the described examples of the electric drive device.

Developments of the method according to the described examples, which comprise features, as they have already been described in context of the developments of the motor vehicle according to an example, also belong to the examples of the motor vehicle.

For this reason, the corresponding developments of the method according to the described examples are not again described here.

In an example, the motor vehicle may be configured as a car, in particular as a passenger car or truck, or as a passenger bus or motorcycle.

The described examples may also include the combinations of the features of the described examples. Thus, the described examples also include realizations, which each comprise a combination of the features of multiple of the described examples, if the examples have not been described as mutually exclusive.

BRIEF DESCRIPTION OF THE DRAWINGS

These and other aspects and advantages will become more apparent and more readily appreciated from the following description of the examples, taken in conjunction with the accompanying drawings of which.

DESCRIPTION

Figure 1:
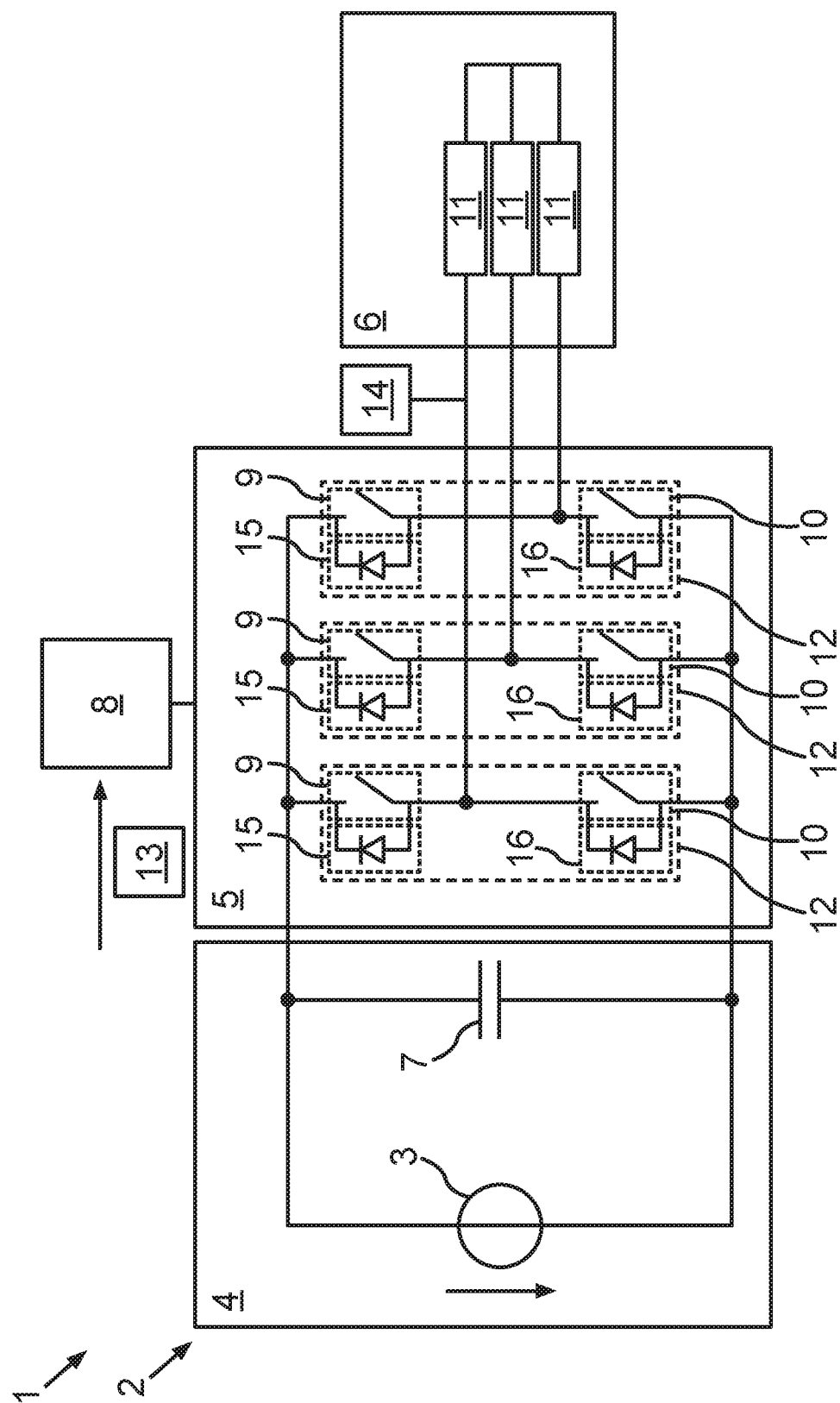
FIG. 1 a schematic representation of an electric drive device.

The examples explained in the following are examples of an invention. In the examples, the described components of the examples each represent individual features to be considered independently of each other, which also each may develop the examples independently of each other. Therefore, the disclosure is to include also combinations of the features of the examples different from the illustrated ones. Furthermore, the described examples can also be supplemented by further ones of the already described features of the examples.

In the figures, identical reference characters each denote functionally identical elements.

FIG. 1 shows a schematic representation of an electric drive device. A motor vehicle 1 is shown, which may comprise the electric drive device 2. The electric drive device 2 may comprise a battery 3, which may be intended to provide energy for driving the electric drive device 2. The battery 3 may be designed as a lithium ion battery. The electric drive device 2 may comprise an intermediate circuit 4, which may be intended to connect the battery 3 to an inverter device 5 in electrically conducting manner. The inverter device 5 may be intended to convert a direct voltage provided on the intermediate circuit 4 into a multi-phase alternating current to operate a motor 6 by the multi-phase current. The multi-phase current may for example include two or three phases. The intermediate circuit 4 may comprise an intermediate circuit capacitor 7, which may be intended to buffer energy. The inverter device 5 may be controlled by a control unit 8 of the electric drive device 2 to be able to switch switching states of high-side switches 9 and low-side switches 10. Phase windings 11 may be connected to the inverter device 5 in electrically conducting manner. Therein, a respective high-side switch 9 and a respective low-side switch 10 of the inverter device 5 may form a half bridge 12, which may be intended for energizing a respective one of the phase windings 11 of the electric motor 6. Thereby, it may be possible to provide a respective phase by a respective one of the half bridges 12. The control unit 8 may be configured to switch the switching states of the low-side switches 10 and the high-side switches 9 during an operation of the electric motor 6 to provide the respective multi-phase current.

In certain situations, for example upon a malfunction or an accident, it may be provided that the motor 6 has to be set into a safe operating mode. Herein, it may in particular be required to avoid spontaneous torque changes in the electric motor 6. At the same time, it may be required for safety reasons to discharge the intermediate circuit 4. One of the safe operating modes is the so-called freewheel. In the freewheel, it is provided that each of the high-side switches 9 and each of the low-side switches 10 are open or switched to blocking to dissipate the current flow into the phase windings 11 of the electric motor 6 via a freewheel path of the antiparallel diodes 15, 16. Such a switching state is illustrated in FIG. 1. It may be effected by the control unit 8, when the control unit 8 receives a safety signal 13, which the control unit 8 receives for switching the freewheel mode and a discharge mode. Upon switching the inverter device 5 into the illustrated freewheel mode, however, the problem may arise that the intermediate circuit 4 cannot be discharged via the inverter device 5 because current cannot flow through the inverter device 5 due to the opened high-side switches 9 and the opened low-side switches 10. For this reason, it may be provided that a current flow is captured in the electric motor 6 by a sensor unit 14 and the captured current flow is compared to a predetermined current criterion by the control unit 8. The predetermined current criterion may for example preset that a current strength of the current through one or all of the phase windings 11 of the electric motor 6 has to be below a predetermined current threshold value. It may be provided that the intermediate circuit 4 may only be discharged if the current strength of the current is below the predetermined threshold value of the current strength. It may be provided that the inverter device 5 is controlled by the control unit 8 upon satisfaction of the current criterion and for example at least one of the high-side switches 9 and at least one of the low-side switches 10 are set to conducting or closed in order that the intermediate circuit 4 may be discharged via the inverter device 5. This switching state is also referred to as active discharge mode. It may additionally be provided that the inverter device 5 is set into an active short circuit mode at the same time for example in that two of the high-side switches 9 or two of the low-side switches 10 are set to conducting.

Figure 2:
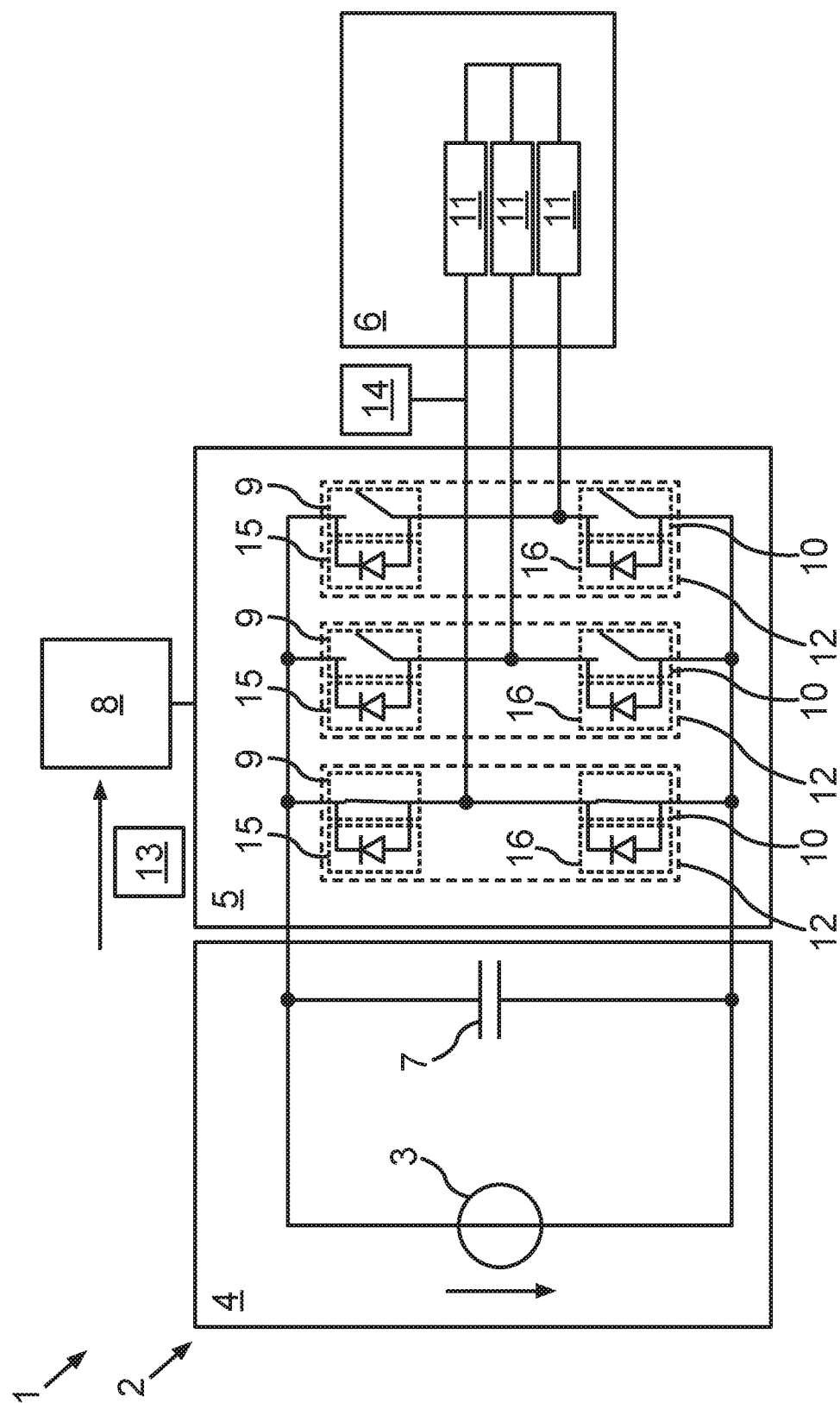
FIG. 2 a schematic representation of an electric drive device in a discharge mode.

FIG. 2 shows a schematic representation of an electric drive device in a discharge mode. The discharge mode may for example be effected by switching a low-side switch 10 and a high-side switch 9 of a half bridge 12 such that a discharge may be effected via the inverter 5.

Figure 3:
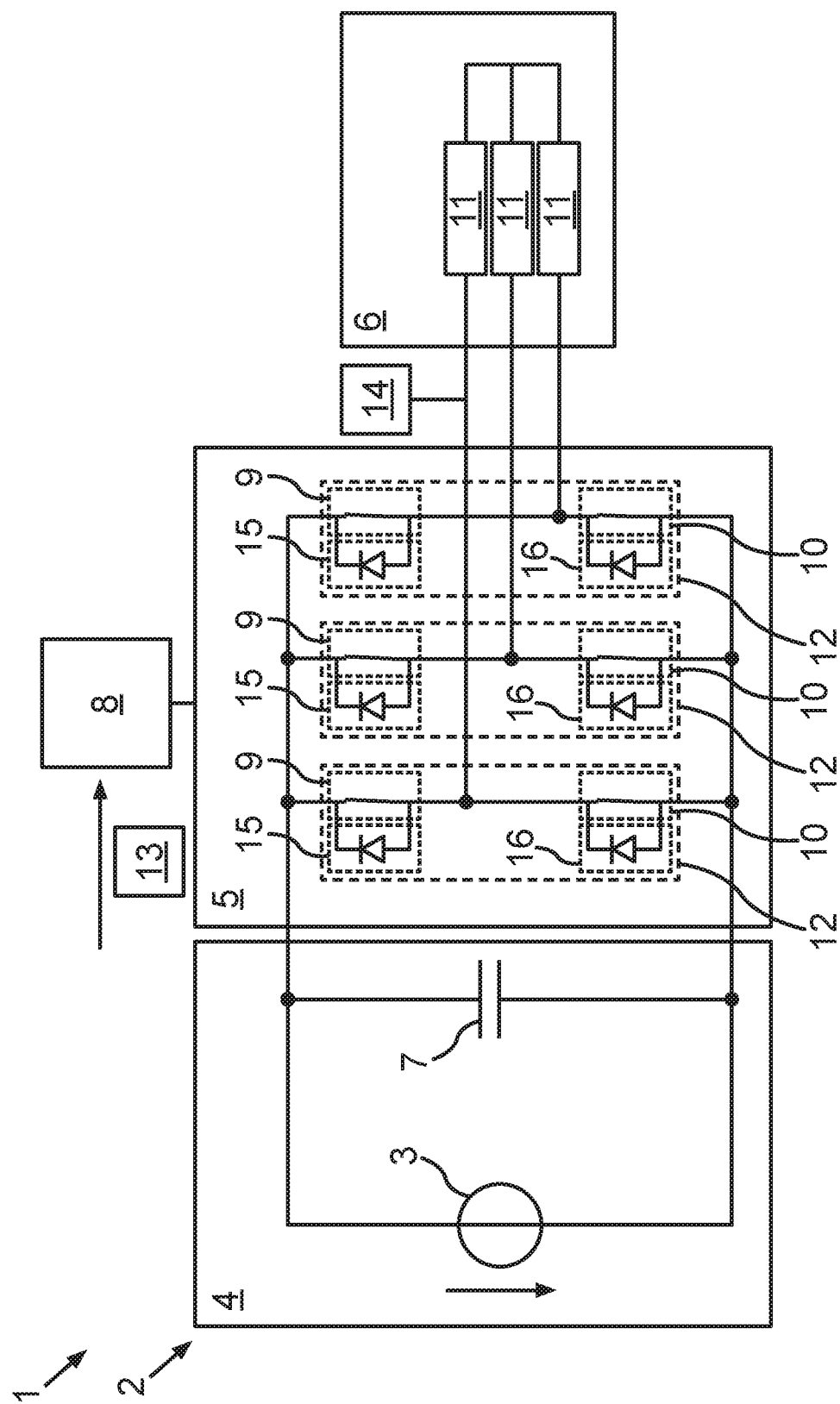
FIG. 3 a schematic representation of an electric drive device in an active short circuit mode.

FIG. 3 shows a schematic representation of an electric drive device in an active short circuit mode. The inverter device 5 may be switched into the active short circuit mode by the control unit 8 in that all of the high-side switches 9 are set to conducting and the low-side switches 10 are set to blocking. It would also be possible to allow an active short circuit in that all of the low-side switches 10 are set to conducting and all of the high-side switches 9 are blocked.

Figure 4:
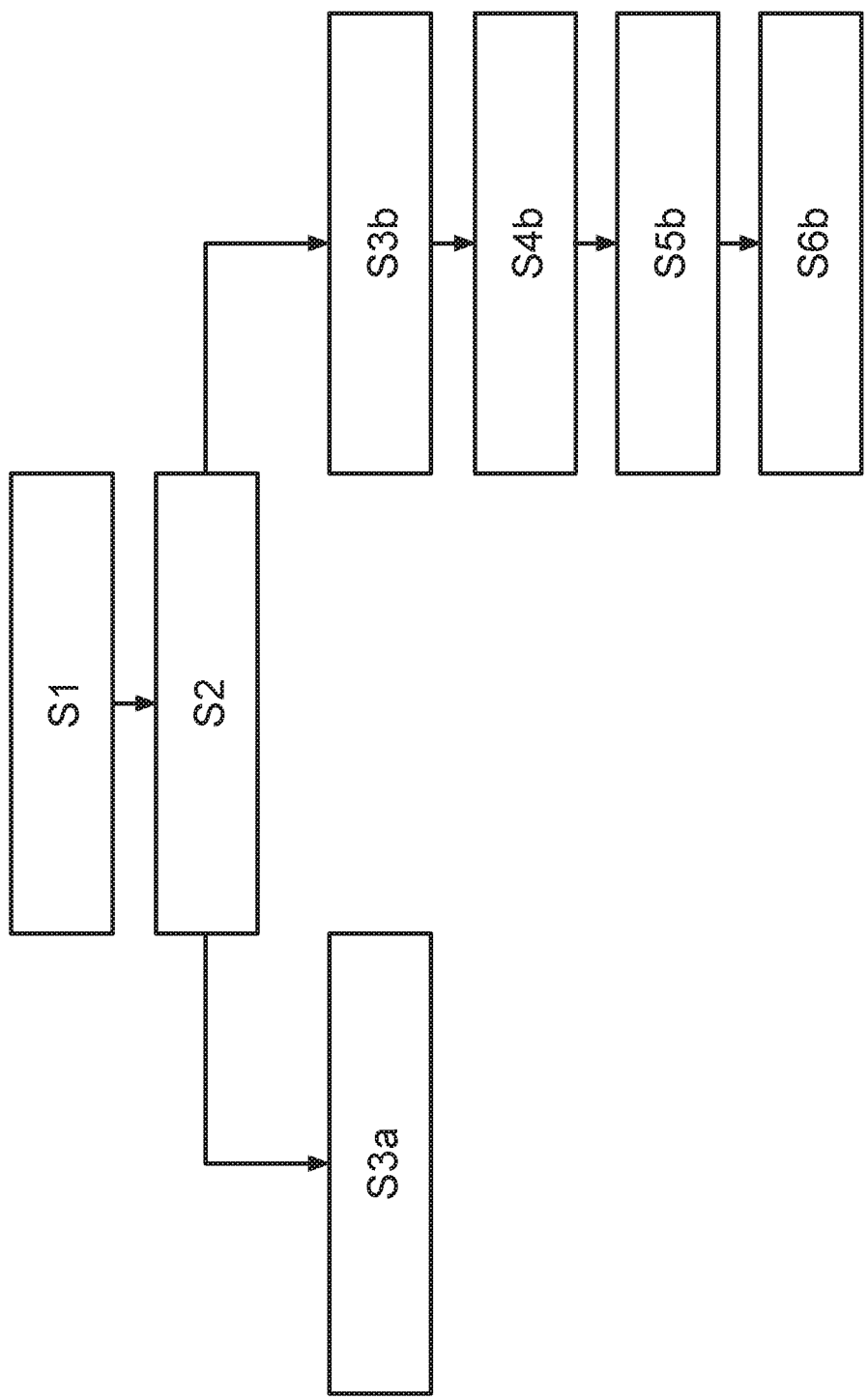
FIG. 4 a schematic representation of a procedure of a method for operating an inverter device.

FIG. 4 shows a schematic representation of a procedure of a method for operating an inverter device.

In a step S1, a safety signal 13 may be received by a control unit 8 of the electric drive device 2, which instructs the control unit 8 for operating the electric motor 6 in a predetermined safe operating mode and for discharging the intermediate circuit 4 in a predetermined discharge mode at the same time.

In a step S2, a case distinction may be performed by the control unit 8, wherein it is examined by the control unit 8 if the predetermined safe operating mode is an active short circuit mode or a freewheel mode. For this purpose, the control unit 8 may ascertain via a captured current course which type the electric motor is. If the electric motor is an asynchronous motor, the freewheel mode may be selected as the safe operating mode. If the electric mode is a permanent magnet synchronous motor, the active short circuit mode may be selected as the safe operating mode.

In case that the predetermined safe operating mode is an active short circuit mode, the inverter device 5 may be controlled by the control unit 8 for operating the electric motor 6 in the predetermined active short circuit mode and for discharging the intermediate circuit 4 in the predetermined discharge mode in a method step S3*a*.

If the predetermined safe operating mode is a predetermined freewheel mode, the inverter device 5 may be controlled by the control unit 8 for operating the electric motor 6 in the predetermined freewheel mode in a method step S3*b*.

In a method step S4*b*, a current strength in the electric motor 6 may be captured by the sensor unit 14 and a satisfaction of a predetermined current criterion based upon the captured current strength may be examined by the control unit 8. For example, the current strength may be below a predetermined threshold value for satisfying the predetermined current criterion. The measurement may be effected at least once.

If the current criterion is satisfied, the inverter device 5 may be controlled by the control unit 8 in a method step S5*b* to terminate the freewheel mode and to set the inverter device 5 into an active discharge mode.

In addition, it may be provided in a step S6*b* that the control unit 8 controls the inverter device 5 to switch the inverter device 5 into the active discharge mode and an active short circuit mode at the same time.

In defined fault cases, for example in load shedding or crash case, the high-voltage powertrain attempts to transition into a safe state. This usually means shutting down the high voltage and the electrical machine, wherein it is attempted to avoid jumps in the torque as well as abrupt braking torques. For discharging the high-voltage intermediate circuit, either discharge resistors specially provided thereto are connected in parallel with the high-voltage on-board power supply. Or alternatively thereto, as far as possible, the energy may for example also be dissipated via the power semiconductors of the drive converter.

At the same time, the electrical machine is transitioned into a safe state according to machine type (for example permanent magnet synchronous motor or asynchronous motor), for example active short circuit (AKS) or freewheel.

Since it may, for example, be mandatory for a freewheel that the power semiconductors of the pulse inverter are not turned on, an active discharge cannot be effected via the present power semiconductors without further measures in this operating state.

The examples describes an operation strategy of how a safe state of the electrical machine may be taken and an active discharge is possible via the power semiconductors independently of machine type.

A separate active discharge via additional components may be omitted, which reduces cost and installation space requirement and makes the fault strategy independent of machine type at least to a certain extent.

If the pulse inverter transitions into the safe state and the active discharge is to be controlled at the same time, it is proceeded as follows. If the active short circuit is taken as the safe state, thus, it may be begun with the active discharge at the same time since the active short circuit may for example be implemented by controlling the low-side switches and the active discharge may be effected by switching on one or more high-side switches. Therein, it does not matter if the high-side switch(es) is (are) controlled in pulsed manner or for example operated in the linear operation.

In case that the freewheel is to be taken, for example in an asynchronous motor, thus, the requested operating state is initially taken. The freewheel is maintained until the current in the machine has decreased to zero or at least below a certain value, which usually may take few 100 ms. During this time, the active discharge remains inactive in order that an undesired erratic torque change does not occur. If the current has correspondingly decreased, the active discharge may be activated. Therein, at least one high-side switch 9 and one low-side switch 10 are controlled. Since the current in the machine is very small and/or equal to 0 at this point of time, an undesired torque does not arise. Optionally, an active short circuit mode may be taken in addition thereto, which may be switched via the high-side switches or the low-side switches.

In an example, it may be be considered that the period of time until the current has decreased below the desired value and subsequently the active discharge has discharged the intermediate circuit to a harmless voltage, does not take longer than the period of time requested in standards. The active discharge and optionally also the electrical machine are to be accordingly considered.

Overall, the examples show, how a discharge of an intermediate circuit may be allowed.

A description has been provided with particular reference to examples, but it will be understood that variations and modifications can be effected within the spirit and scope of the claims, which may include the phrase "at least one of A, B and C" as an alternative expression that refers to one or more of A, B or C, contrary to the holding in Superguide v. DIRECTV, 358 F3d 870, 69 USPQ2d 1865 (Fed. Cir. 2004).

The invention claimed is:

1. A method of operating an inverter device of an electric drive device, wherein the inverter device includes at least two half bridges with each half bridge of the at least two half bridges including a low-side switch and a high-side switch, respectively, to provide a plurality of low-side switches and a plurality of high-side switches, and is configured to be connected to a respective phase winding of a plurality of phase windings of an electric motor of the electric drive device to convert a direct voltage of an intermediate circuit, which is configured to connect a battery to the inverter device, into a multi-phase alternating current of the plurality of phase windings of the electric motor to operate the electric motor, the method comprising:

by a control unit of the electric drive device,
receiving a safety signal, which instructs the control unit to operate the electric motor in a safe operating mode including an active short circuit mode, or a freewheel mode, and to discharge the intermediate circuit via the inverter device in an active discharge mode at same time,
if the active short circuit mode is set for the safe operating mode, controlling the inverter device to operate the electric motor in the active short circuit mode and to discharge via the inverter device the intermediate circuit in the active discharge mode,
if the freewheel mode is set for the safe operating mode,
controlling the inverter device to operate the electric motor in the freewheel mode,
examining a current strength captured by a sensor unit in the electric motor to determine a satisfaction of a current criterion below a threshold indicative of admissible discharge of the intermediate circuit that reduces erratic torque change by the electric motor, and
upon satisfaction of the current criterion, controlling the inverter device to terminate operation of the electric motor in the freewheel mode and to switch to the active discharge mode to discharge via the inverter device the intermediate circuit in the active discharge mode.

2. The method according to claim 1, wherein in the active short circuit mode, at least two low-side switches of the plurality of low-side switches of the inverter device are switched to conducting by the control unit to short-circuit at least two phase windings of the electric motor.

3. The method according to claim 1, wherein in the active discharge mode, at least one of the plurality of high-side switches and at least one of the plurality of low-side switches of the inverter device are switched to conducting by the control unit.

4. The method according to claim 1, wherein in the freewheel mode, each of the plurality of low-side switches of the inverter device and each of the plurality of high-side switches of the inverter device are switched to blocking by the control unit.

5. The method according to claim 1, wherein in the active short circuit mode, at least two of the plurality of high-side switches of the inverter device are switched to conducting by the control unit to short-circuit at least two phase windings of the plurality of phase windings of the electric motor.

6. The method according to claim 1, wherein upon satisfaction of the current criterion, the inverter device is controlled by the control unit for the active short circuit mode and in the active discharge mode at same time.

7. A control unit to operate an inverter device comprising:
a processing device to execute a process including,
receiving a safety signal, which instructs the control unit to operate an electric motor in a safe operating mode including an active short circuit mode, or a freewheel mode, and to discharge an intermediate circuit for the inverter device via the inverter device in an active discharge mode at same time,
if the active short circuit mode is set for the safe operating mode, controlling the inverter device to operate the electric motor in an active short circuit mode and to discharge via the inverter device the intermediate circuit in the active discharge mode,
if the freewheel mode is set for the safe operating mode,
controlling the inverter device to operate the electric motor in the freewheel mode,
examining a current strength captured by a sensor unit in the electric motor to determine a satisfaction of a current criterion below a threshold indicative of admissible discharge of the intermediate circuit that reduces erratic torque change by the electric motor, and
upon satisfaction of the current criterion, controlling the inverter device to terminate operation of the electric motor in the freewheel mode and switch to the active discharge mode to discharge via the inverter device the intermediate circuit in the active discharge mode.

8. The control unit according to claim 7, wherein in the active short circuit mode, at least two low-side switches of a plurality of ow-side switches of the inverter device are switched to conducting by the control unit to short-circuit at least two phase windings of the electric motor.

9. The control unit according to claim 7, wherein in the active discharge mode, at least one of a plurality of high-side switches and at least one of a plurality of low-side switches of the inverter device are switched to conducting by the control unit.

10. The control unit according to claim 7, wherein in the freewheel mode, each of a plurality of low-side switches of the inverter device and each of a plurality of high-side switches of the inverter device are switched to blocking by the control unit.

11. The control unit according to claim 7, wherein in the active short circuit mode, at least two high-side switches of a plurality of high-side switches of the inverter device are switched to conducting by the control unit to short-circuit at least two phase windings of the electric motor.

12. The control unit according to claim 7, wherein upon satisfaction of the current criterion, the inverter device is controlled by the control unit for the active short circuit mode and in the active discharge mode at same time.

13. An electric drive device, comprising:
a control unit configured to execute a process including,
receiving a safety signal, which instructs the control unit to operate an electric motor in a safe operating mode including an active short circuit mode, or a freewheel mode, and to discharge an intermediate circuit for an inverter device via the inverter device in an active discharge mode at same time,
if the active short circuit mode is set for the safe operating mode, controlling the inverter device to operate the electric motor in the active short circuit mode and to discharge via the inverter device the intermediate circuit in the active discharge mode,
if the freewheel mode is set for the safe operating mode,
controlling the inverter device to operate the electric motor in the freewheel mode of the intermediate circuit to reduce erratic torque change by the electric motor,
examining a current strength captured by a sensor unit in the electric motor to determine a satisfaction of a current criterion below a threshold indicative of admissible discharge of the intermediate circuit that reduces erratic torque change by the electric motor, and
upon satisfaction of the current criterion, controlling the inverter device to terminate operation of the electric motor in the freewheel mode and switch to the active discharge mode to discharge via the inverter device the intermediate circuit in the active discharge mode.

14. A motor vehicle including the electric drive device according to claim 13.

* * * * *